Sept. 3, 1957 T. SHERWEN 2,805,083
HITCH CONNECTIONS BETWEEN TRACTIVE VEHICLES AND DEVICES
TRAILED THEREBY USING POWER MEANS FOR
LIFTING A COUPLING ELEMENT
Filed Dec. 3, 1948 6 Sheets-Sheet 1
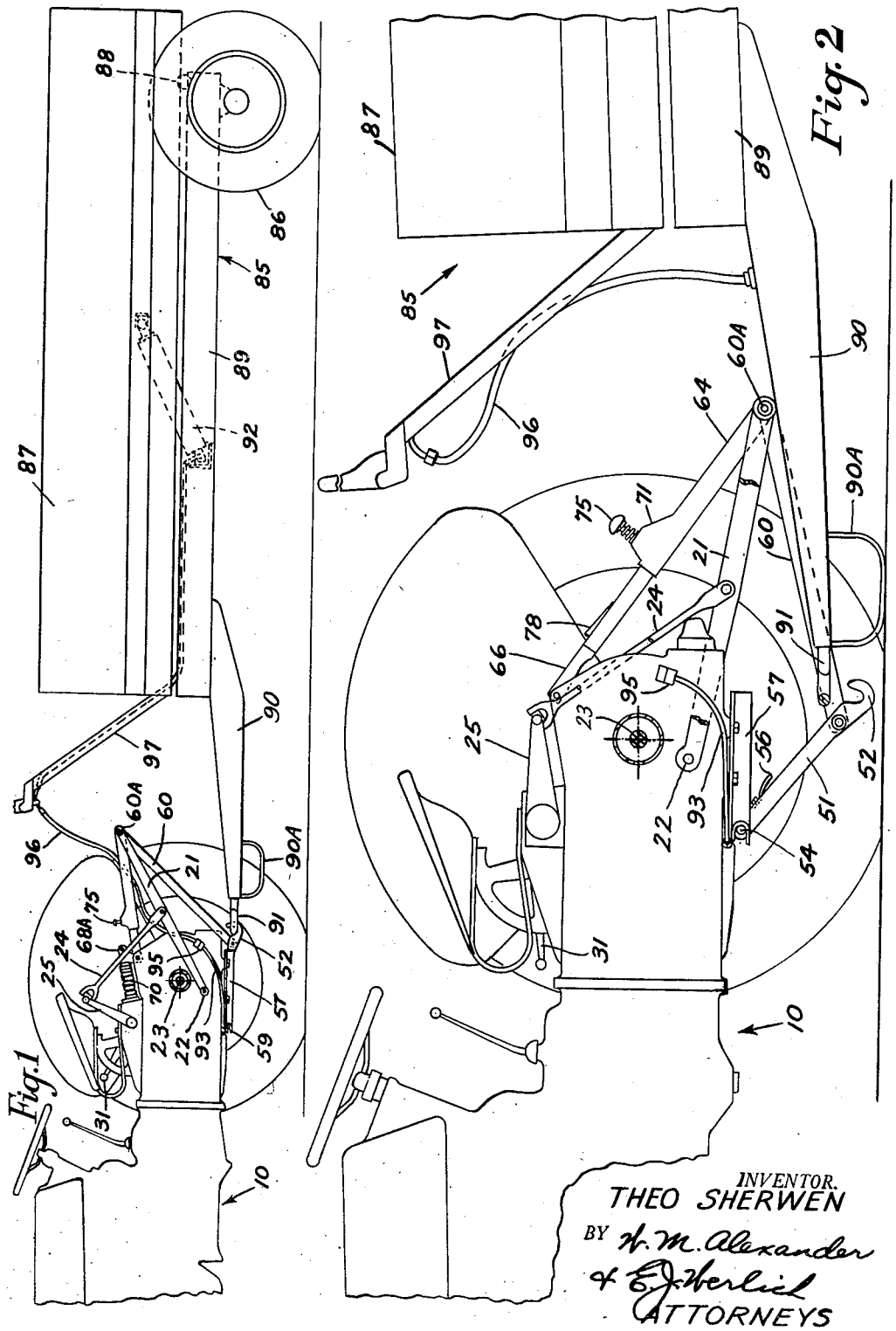
INVENTOR.
THEO SHERWEN
BY W. M. Alexander
& E. J. Werlich
ATTORNEYS

INVENTOR.
THEO SHERWEN

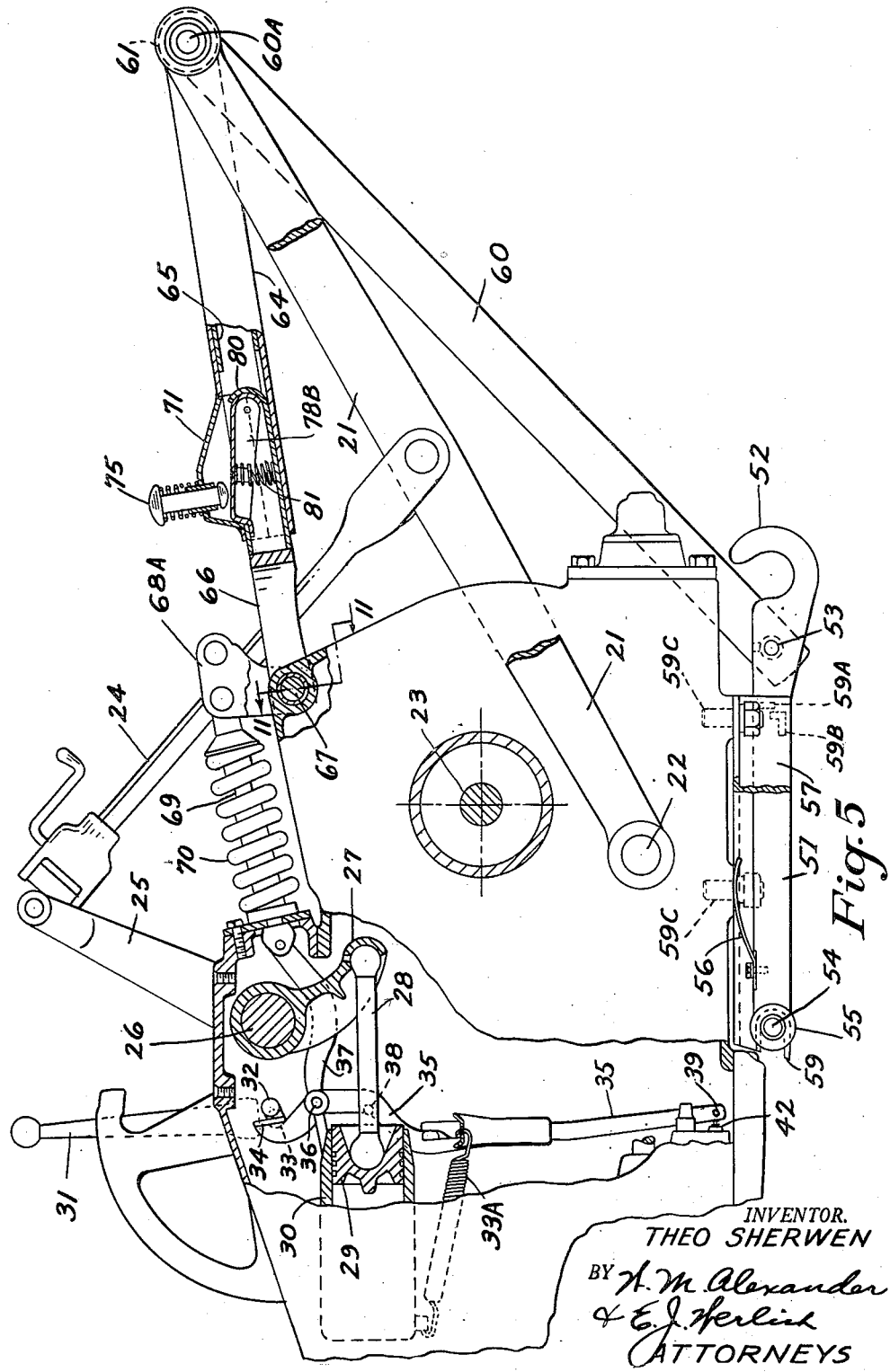

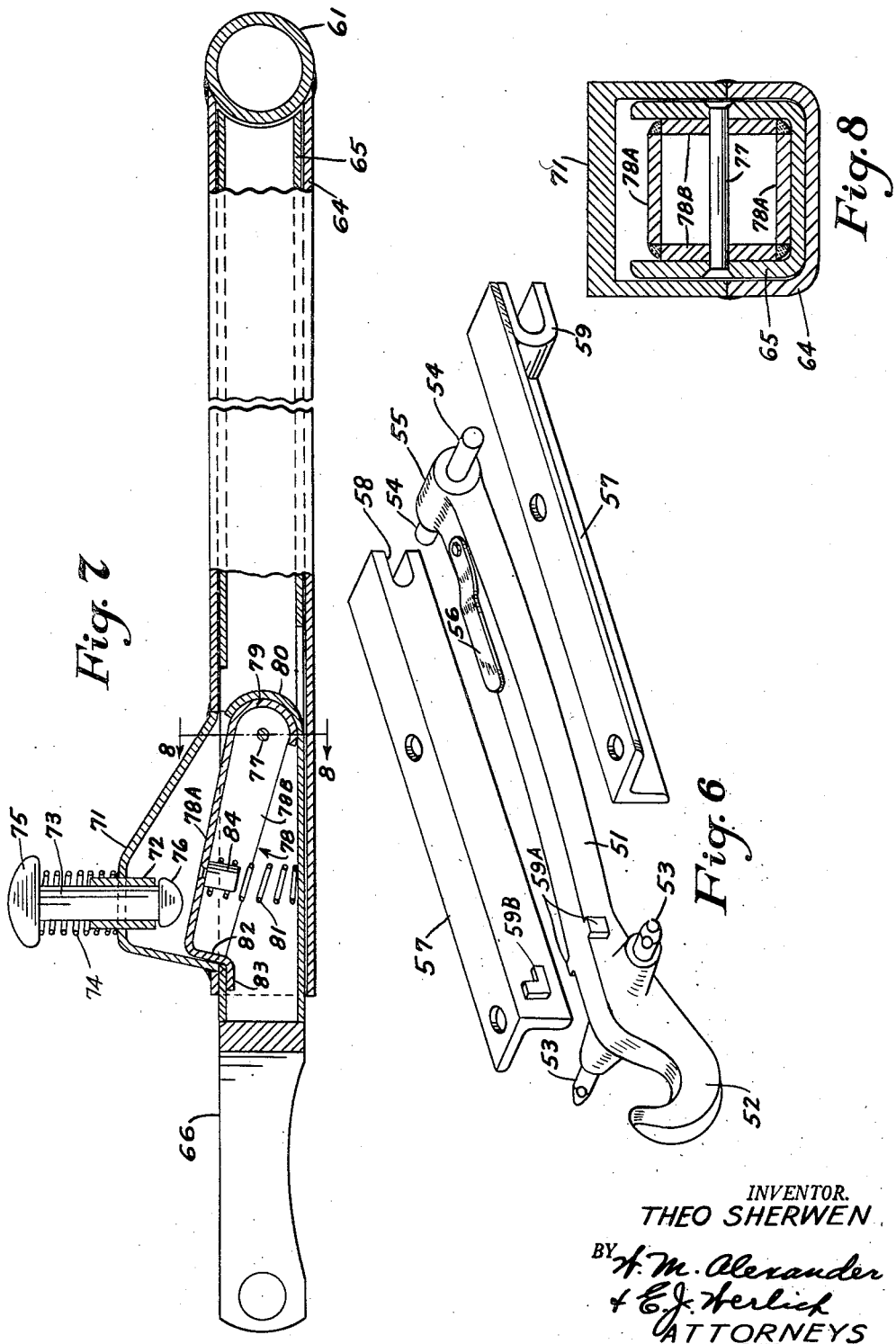

Sept. 3, 1957 T. SHERWEN 2,805,083
HITCH CONNECTIONS BETWEEN TRACTIVE VEHICLES AND DEVICES
TRAILED THEREBY USING POWER MEANS FOR
LIFTING A COUPLING ELEMENT
Filed Dec. 3, 1948 6 Sheets-Sheet 5
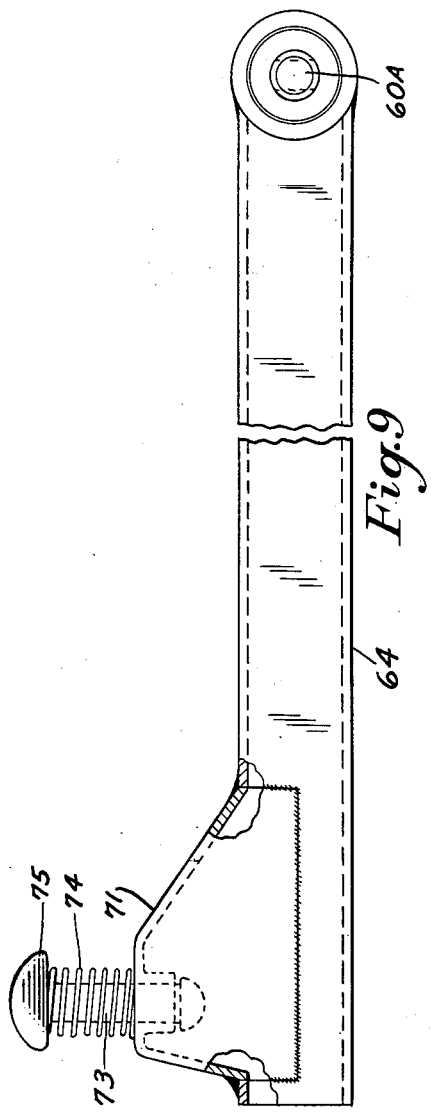
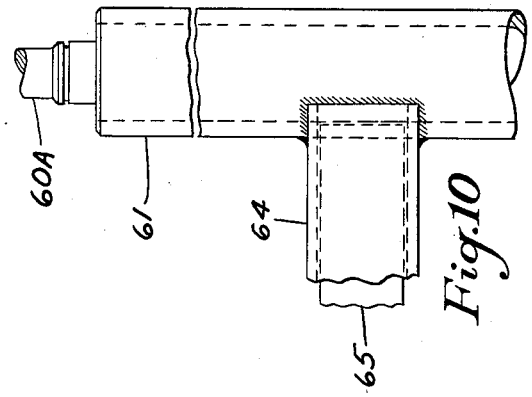
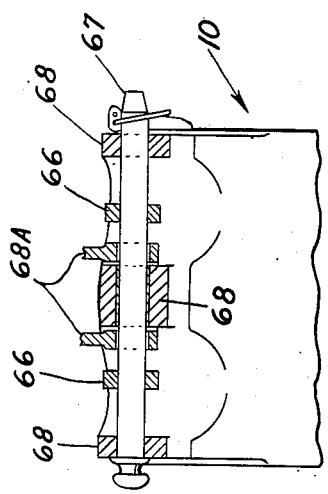
INVENTOR.
THEO SHERWEN
BY *H. M. Alexander*
*& E. J. Herlich*
ATTORNEYS Sept. 3, 1957 T. SHERWEN 2,805,083
HITCH CONNECTIONS BETWEEN TRACTIVE VEHICLES AND DEVICES
TRAILED THEREBY USING POWER MEANS FOR
LIFTING A COUPLING ELEMENT
Filed Dec. 3, 1948 6 Sheets—Sheet 6

INVENTOR.
THEO SHERWEN
BY *H. M. Alexander*
*& E. J. Werlich*
ATTORNEYS

United States Patent Office 2,805,083
Patented Sept. 3, 1957

2,805,083

HITCH CONNECTIONS BETWEEN TRACTIVE VEHICLES AND DEVICES TRAILED THEREBY USING POWER MEANS FOR LIFTING A COUPLING ELEMENT

Theo Sherwen, Leamington Spa, England, assignor, by mesne assignments, to Massey-Harris-Ferguson Inc., Racine, Wis., a corporation of Maryland Application December 3, 1948, Serial No. 63,404

15 Claims. (Cl. 280—479)

This invention relates to arrangements for attaching to a tractor, having a power operated hitch, a trailed vehicle or implement. It has special utility as applied to the coupling of forwardly over-balanced trailers (for example, a trailer of the familiar two-wheel type) to tractors having a power elevatable hitch linkage such, for example, as that currently used in the "Ferguson" tractor and as to which reference may be made to H. G. Ferguson Patent No. 2,118,180, issued May 24, 1938.

One object of the present invention is to utilize the raising and lowering motion of the power operated hitch on a tractor to effect coupling and uncoupling of trailed equipment while at the same time avoiding the necessity of retaining the power unit on the tractor loaded by transferred trailer weight once the trailer front end has been lifted into coupled position.

Another object is to minimize the hazards of up-ending the tractor incident to transferring a heavy weight to its rear end from trailed equipment.

Still another object is to afford a coupling which is not only engageable from a very low point to thereby accommodate the forwardly heeled position that an over-balanced trailer normally occupies when uncoupled, but which is also such that the point of load application through the coupling when once established has a location most favorable for traction and steering as well as for safety of operation.

It is the aim here to accomplish such objectives by mechanism that is rugged in construction, low in manufacturing cost and which can be readily operated by the driver from his seat on the tractor without either unusual exertion or special dexterity and training.

Further objects and advantages of the invention will become apparent as the following description proceeds taken in connection with the accompanying drawings in which:

Figure 1 is a side view of a trailer and the rear portion of a tractor, coupled by an arrangement embodying the present invention, one rear tractor wheel being removed for the sake of clarity.

Fig. 2 is a fragmentary side view on somewhat larger scale of the tractor and trailer of Fig. 1 but with the coupling elements disengaged.

Fig. 5 is an enlarged side elevation, partially in section, of the tractor's rear end center housing and associated hitch and coupling elements.

Fig. 6 is an exploded, detail perspective view of the coupling hook and certain of its associated supporting parts used in the installation shown in Figs. 1–5.

Fig. 7 is an enlarged detail side elevational view, partially in longitudinal section, of the telescoping suspension strut assembly used in the installation of Figs. 1–5.

Fig. 8 is an enlarged transverse sectional view taken substantially along the line 8—8 in Fig. 7.

Fig. 9 is a side elevation partially in section of one of the telescoping elements included in the device of Fig. 7.

Fig. 10 is a fragmentary plan view of the strut assembly of Fig. 7.

Fig. 11 is an enlarged detail sectional view taken substantially along the line 11—11 in Fig. 5.

Referring more particularly to the drawings, the invention has been exemplified herein as embodied in a mechanism specially designed for use on the present commercial form of "Ferguson" tractor. Such mechanism has, accordingly been illustrated as installed on such a tractor indicated in this instance at 10 in Fig. 1. It will be appreciated by those skilled in the art, however, that various substitutions or changes in parts, or alternative or modified arrangements may be used, particularly in accommodating the mechanism to other specific forms of tractors. There is, therefore, no intention to limit the invention to the precise mechanism illustrated. On the other hand, the intention is to cover all alternative or equivalent constructions following within the spirit and scope of the invention as expressed in the appended claims.

*Tractor and its power operated hitch*

The general construction and operation of the illustrated tractor, including its power operated hitch, will be familiar to those skilled in the art, and for further details reference may also be made to Ferguson Patent No. 2,118,180, mentioned above. For the present, it will suffice simply to identify those tractor parts with which the mechanism of the present invention is directly associated.

Figure 13:
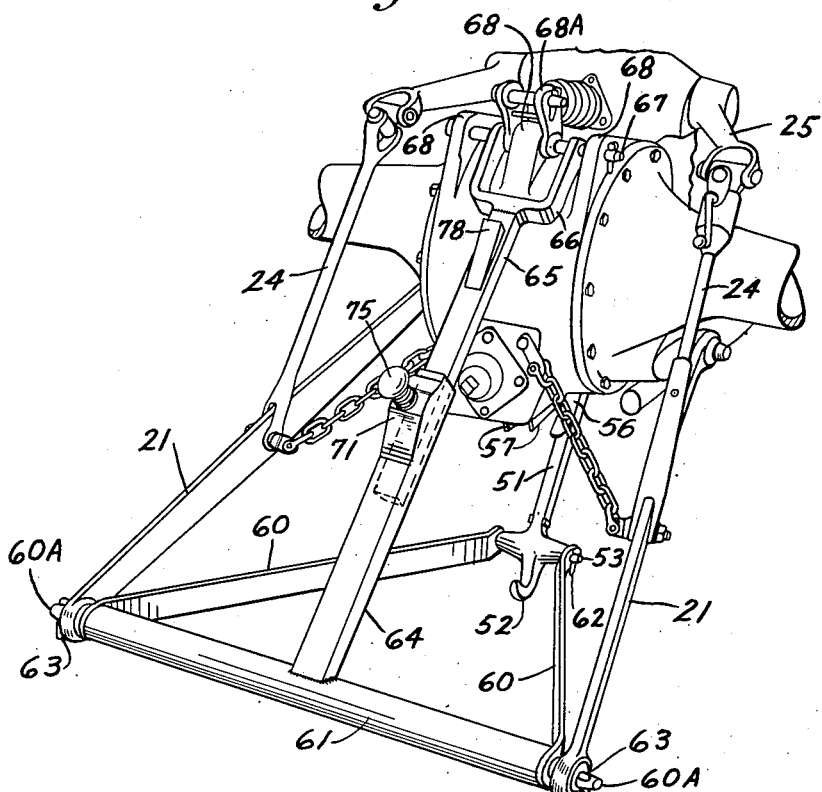
Fig. 13 is a perspective view from the rear of the tractor, showing the mechanism of the present invention installed on the tractor and located preparatory to the coupling on of a trailer.

Trailing from the rear end of the tractor 10 (see Figs. 1, 2 and 13) is a pair of hitch links 21 disposed in forwardly converging, side-by-side relation and pivoted at 22 on the tractor's center housing to swing vertically in unison as well as to sway laterally. The pivots 22 are located below and slightly forward of the center of the tractor's rear axle 23. Drop links 24 suspend the hitch links 21 from crank arms 25 rigidly fixed to opposite ends of a transverse rock shaft 26 (see Fig. 5) journaled in the upper portion of the center housing. A depending arm 27, also rigid with the shaft 26, is socketed to receive the rear end of a connecting rod 28, which connects this arm to a ram piston 29 slidable in a hydraulic cylinder 30. Admission of pressure fluid to the cylinder 30 thrusts the piston 29 to the rear, raising the hitch links 21, while exhaust fluid from the cylinder permits the hitch links to descend under the force of gravity.

Manual control of the hydraulic power mechanism for the hitch links is accomplished by quadrant lever 31 located within convenient reach of the driver. Fixed to this lever is a cam projection 32 eccentric to the lever's pivot 33 and arranged to bear against a follower pad 34 on the upper end of a floating lever 35. A contractile spring 33A urges the lever 35 to swing clockwise about its pivot 36 on a sliding member 37 and thus retain the pad 34 in contact with the eccentric pin 32.

Figure 12:
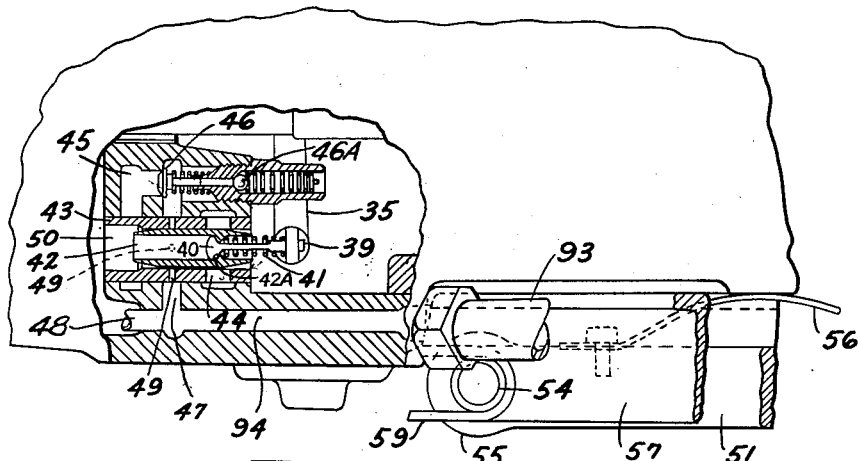
Fig. 12 is a detail view, partially in section, of the lower portion of the tractor center housing and showing particularly the valving of the tractor's hydraulic system.

The lower end of the lever 35 is pivotally connected to a stem 39 (see Fig. 12) having an enlarged head 40 received within a generally cylindrical valve plunger 42 having tapered end portions. The head 40 is held against an internal shoulder 42A in the plunger by a compression spring 41. The valve plunger 42 is slidable in a sleeve 43 having axially spaced sets of intake and exhaust ports 44 and 49, respectively. With the valve plunger 42 in its mid or neutral position, both sets of ports are blocked. Sliding of the plunger in either direction from its neutral position opens a corresponding set of the ports (a progressive opening taking place due to the tapered shape of the plunger) but retains the other set blocked.

When the quadrant lever 31 is pulled to its upper or "raise" position, shown in Fig. 5, the eccentric 32 tends to retreat from the follower 34 so that the spring 33A swings the floating lever 35 clockwise about its pivot 36, thereby thrusting the valve plunger 42 leftward (as viewed in Fig. 12) to uncover the supply ports 44 while retaining the exhaust ports 49 closed. Thereupon, pressure fluid (such as oil) is admitted from a sump constituted by the lower portion of the center housing, through the ports 44, and thence to a suitable pump (not shown) driven by the tractor engine. Fluid under pressure is delivered by such pump to a passage 45 from which it passes through a spring loaded check valve 46 into a passage 47, and from there through a line 48 into the cylinder 30. The piston 29 is thus pushed toward the rear end of the cylinder, raising the hitch links 21. When the hitch links reach their uppermost position, the skirt of the piston 29 emerges from the cylinder 30 and contacts projections 38 on the floating lever 35, thereby rocking it counterclockwise a sufficient distance to restore the valve plunger 42 to neutral and cut off further supply of oil to the pump.

To lower the hitch links, the quadrant lever 31 is pushed forward to its "lowering" position and as a result of which the floating lever 35 is rocked counterclockwise, pulling the valve plunger 42 rightward (as viewed in Fig. 12) to uncover the exhaust ports 49 while retaining the supply ports 44 closed. Fluid is thus exhausted from the cylinder 30 through the line 48, exhaust ports 49 and the open end 50 of the sleeve 43 into the sump so that the hitch linkage lowers under its gravity load.

*Novel coupling equipment*

As so far described, the installation is simply the familiar one in the current commercial form of "Ferguson" tractor. Pursuant to the aims of the present invention, equipment embodying the present invention is installed on such exemplary tractor to utilize raising and lowering of the power operated hitch links 21 for coupling and uncoupling any desired trailed equipment.

In the illustrative embodiment, the coupling equipment or harness installed on the tractor (see Figs. 2 and 13) includes a link 51 carrying some desired form of coupling element, here shown as an integral hook 52. As best shown in Fig. 6, pivot projections 53 are arranged to extend laterally from the link 51 adjacent its rear or hook end while a second pair of lateral pivot projections 54 are provided on the link 51 at its rounded forward end 55. The latter projections 54, which may be defined by the end portions of a transverse pin, are in this instance received in slots 58, defined by U-shaped members 59 fixed to a pair of supporting angle irons or anchorage fittings 57 lying along opposite sides of the link 51. Cap screws 59C (Fig. 5) secure these angle irons to mounting pads or bosses normally provided on the underside of the housing on the "Ferguson" tractor so that the angle irons nest against the underside of such housing. With this arrangement, the out-turned legs of the angle irons or anchorage fittings 57 define mounting faces for securing the fittings 57 to the underside of the tractor housing.

The anchorage fittings 57 locate the link 51 in a position such that the latter's pivots 54 are displaced below and somewhat forwardly of the hitch link pivots 22.

Figure 3:
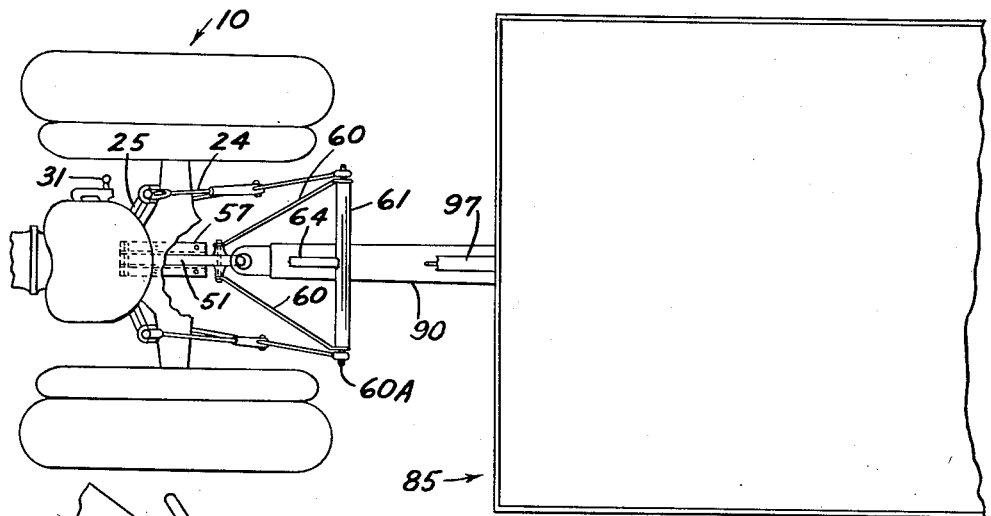
Fig. 3 is a plan view of the installation shown in Fig. 1 and with some of the parts cut away.

Reinforcement of the link 51 against lateral bending, incident to turning of the tractor when a trailer is being towed from the hook 52, is afforded by the angle irons 57. As the angle irons lie closely alongside the link with the latter nested therebetween (see Fig. 3), the angle irons define laterally spaced, opposed rigid abutments which restrain the link against lateral bend or sway. In the present instance, the small clearance between the angle irons and link being largely taken up by bosses 59A (see Fig. 6) on the link and bosses 59B in the angles.

Coacting with the link 51 is a pair of links 60 (see Figs. 2, 3 and 13) pivoted at their forward ends on respective ones of the projections 53 and at their rear ends, by connections hereafter described, to the trailing ends of corresponding ones of the hitch links 21. The links 51, 60 thus constitute a jointed supporting linkage for the coupling hook 52. Such supporting linkage jackknifes or sags downward to the position shown in Fig. 2 when the hitch links 21 are lowered locating the hook 52 at or near ground level so it can go beneath even a very low lying mating coupling element on a trailer. Upon rise of the hitch links to the elevated position of Fig. 1, the supporting linkage 51, 60 tends to straighten out, elevating the hook to towing position. The jackknifing of the linkage 51, 60 results in an exaggeration of hook motion as compared to hitch link motion and, moreover, locates the hook more favorably for purposes of coupling, towing and steering than would be the case if the hook were rigidly attached to the hitch linkage.

When the hook 52 is in towing position (see Figs. 1 and 5), it closely underlies and is, in effect, closed by the underside of the tractor's center housing. A complemental coupling element engaged by the hook is thus prevented from inadvertent disengagement. The location of the hook in its towing position is also significant in other respects. Being close to the point of ground contact for the rear wheels, there is a minimization of the moment arm of the draft load about such point and hence minimization of the tendency of the draft load to tip the tractor over backward. Since the hook is located well forward toward the vertical plane passing through the tractor's rear axle, the trailed equipment is close coupled, an advantageous feature during turning since the trailer is not switched out in a wide arc, and the tractor's steering interfered with as would be the case if the trailer swung laterally about some point displaced far to the rear of the tractor's rear axle, as, for example, at the trailing ends of the hitch links 21. Too, the location of the hook close to a vertical plane passing through the rear axle makes possible transfer of weight from the trailer to the tractor's rear wheels for augmenting traction while at the same time effecting a minimization of any lifting effect on the tractor front end.

To relieve the hydraulic ram 29, 30 of load once the hook 52 has been raised by the hitch links 21 into towing position, provision is made for positively limiting the rise of the hitch links and for automatically latching the hitch in place when that limited rise is completed. In the present instance, a generally T-shaped assembly (Fig. 13) is installed on the hitch, comprising a transverse cross-bar 61 and a telescoping suspension link 64, 65. The reduced end portions 60A of the bar 61 are received in the usual apertured balls socketed in the ends of the hitch links 21, being retained in place by linch pins 63. It is on such reduced ends 60A of the bar 61 that the supporting links 60 are pivoted, thereby making it impossible to complete the installation of the linkage 51, 60 for raising the hook 52, except when the bar 61 is in place, all as a special safety measure, as will later appear.

The suspension link is shown as comprising telescoping tubular members 64, 65 of generally rectangular or squared cross-section (see Figs. 7, 8, 9, 10 and 13). The lower end of the member 64 is welded or otherwise rigidly joined to the center of the cross-bar 61. On the other hand, the upper end of the other strut member 65 terminates in a clevis 66 journaled on a transverse pin 67 normally provided in the "Ferguson" tractor illustrated. This pin 67 is received in bosses or ears 68, and has mounted on it the usual rocker 68A operating through a rod 69 (Fig. 5) against the bias of a control spring 70 to shift the member 37 during automatic draft control operation. Since automatic draft control operation is not required or used with the equipment of the present invention, further description of the same is unnecessary here. Suffice it to note that in the present case the pin 67 serves simply as a conveniently located anchorage point or attachment fitting on the tractor for the strut 64, 65.

The telescoping elements 64, 65 of the suspension strut are of sufficient length to remain in telescoped relation with each other throughout the full normal range of lowering movement for the hitch links 21. The upper strut element 65 is, however, long enough so that upon elevation of the hitch links 21 the lower end of this strut element 65 will abut solidly against the cross-bar 61 (see Fig. 7), thereby arresting further elevation of the hitch links, when the latter have been brought up to a position a little short of their full rise. This stoppage in the rise of the hitch links 21 is accomplished at a point such that the latter are stopped before the skirt of the piston 29 (see Fig. 5) has contacted the projections 38 for restoring the valve plunger 42 to neutral. Provision is moreover made for mechanically latching the strut elements 64, 65 against re-extension once they have been slid, by elevation of the hitch links 21, into their position of substantially full contraction. For the latter purpose, a latch 78 (see Fig. 7) is provided on the upper strut element 65 to bear against a coacting abutment or keeper constituted by the forward wall of a protuberance 71 on the lower strut element 64.

The latch 78 may, for example, be conveniently fashioned from sheet metal in the form shown. Thus, in the construction illustrated (see Figs. 7 and 8), the latch 78 is fashioned of sheet metal and has a section of inverted U-shape defined by a top piece 78A and side pieces 78B. The whole is pivoted on a transverse rivet 77 passing through the side walls of the strut element 65. The tail 79 of the latch top piece 78A is curled under in rounded form and is embraced by a complementally curved piece 80 struck up from the bottom wall of the strut element 65 so that the thrust load on the latch will be transferred to the strut element 65 through the parts 79, 80 rather than simply through the rivet 77. The forward end of the latch top piece 78A is turned down to form a shoulder 82 terminating in a lip 83, the shoulder 82 receiving the thrust on the latch from the keeper 71. A coil spring 81 surrounding a locating stud 84 yieldably thrusts the latch 78 outward into latching position, such outward movement of the latch being limited by the lip 83.

For manual release of the latch 78, a plunger 73 is slidably mounted in a sleeve 72 fixed in the top wall of the keeper housing 71. This plunger has a headed lower end 76 and a large button or head 75 on its upper end and on which the operator pushes to release the latch. A coil spring 74 normally holds the plunger out of contact with the latch.

Trailed equipment

The hitch operated coupling mechanism or harness described above can be used for coupling a wide variety of types of trailed equipment to the tractor. Since it is especially effective in coupling a forwardly over-balanced two-wheel type of trailer, it has been so illustrated herein. Moreover, in the illustrated arrangement, the trailer has been shown (see Fig. 1) as equipped with hydraulic actuating mechanism since one of the important advantages of the coupling harness disclosed is that it leaves the main hydraulic system on the tractor free for supply of auxiliaries, even while the tractor hitch links 21 are elevated with the hook 52 in towing position.

In the particular installation illustrated, a trailer 85 is shown having a pair of wheels 86 disposed well to the rear so that it is heavily over-balanced in a forward direction. A box body 87 for the trailer is pivoted at 88 on a trailer frame 89 so that the body may be tipped rearwardly about this pivot for dumping.

Projecting from the front end of the frame 89 is a draft tongue 90 terminating in a coupling element in the form of an eye 91 dimensioned to receive the hook 52. Fixed to the underside of the tongue 90 is a stand 90A arranged to hold the eye 91 a few inches above the ground (see Fig. 2) when the trailer is disconnected from the tractor.

For raising the trailer body 87 into dumping position, a one-way, piston and cylinder type ram 92 is provided, one end of the assembly being pivotally connected to the frame 89 and the other end being pivotally connected to the body 87 (see Fig. 1). Pressure fluid (oil) is supplied to this ram through a flexible conduit 96 led up along an inclined stanchion 97 and terminating in a pressure fitting 95 by means of which it is connected to a conduit 93 leading to a passage 94 (see Fig. 12) communicating with the passage 47 in the valve assembly heretofore described. A manual cut-off valve (not shown) may be interposed in the supply connections to the auxiliary ram 92, if desired. Pressure fluid is either supplied to the ram 92 for raising the trailer body or exhausted from the auxiliary ram for lowering the same, depending upon whether the passage 47 is being supplied with oil delivered from the pump or connected to exhaust through ports 49, all as governed by the position of the main valve plunger 42.

Resume of operation

With the previously described coupling harness installed on the tractor and its hook 52 lowered (see Fig. 2), coupling the trailer 85 onto the tractor 10 is but the work of a moment. The driver backs the tractor toward the trailer until the hook 52 underlies the eye 91. Having brought the tractor to a stop in that position, the driver swings the quadrant lever 31 upward to "raise" position, causing the hydraulic unit to raise the hitch links 21. As a result, the linkage 51, 60 is raised and straightened, elevating the coupling hook 52. As the latter hook engages the eye 91, lifting of the trailer's front end begins, being finally completed when the hook 52 reaches the substantially horizontal towing position shown in Fig. 1.

As the hitch links 21 rise, the strut elements 64, 65 telescopingly slide together until the latch 78 finally rides within the keeper 71, snapping into place inside it. With only a fraction of an inch of additional rise, the strut element 65 bottoms against the cross-member 61, arresting further upward movement of the hitch and coupling harness with the parts substantially in the position shown in Fig. 1.

Up to this point, the weight transferred from the trailer to the tractor through the hook 52 has been carried on the oil in the tractor's ram cylinder 30. Upon engagement of the latch 78, however, the operator can now swing the quadrant lever back down to its "lowering" position, and in which pressure is relieved in the cylinder 30 through opening of the exhaust ports 49. The transferred load from the trailer is thus sustained by the latched suspension strut 64, 65 instead of by the main ram. The parts are thus maintained in coupled position through the mediation of the mechanical latching arrangement and without the necessity of continuing the pumping of hydraulic fluid. As a consequence, the consumption of power that would otherwise be entailed in continuously maintaining sufficient pressure to sustain the trailer load is obviated. So too, the continuous and damaging blowing of oil through safety valve 46A (Fig. 12) that would be entailed in permitting the pump to continue oil delivery with the hitch links blocked in partially raised position, is also avoided.

Having coupled on the trailer in this manner, the driver can simply drive the tractor around for any desired haulage of the trailer. Weight transferred from the forwardly over-balanced trailer to the hook 52 acts to hold the rear wheels of the tractor down for augmenting traction. The location of the hook 52 is such as to apply the draft load to the tractor along a favorable line of draft such that any tendency to relieve the loading on the tractor's front wheels, and which relief would otherwise interfere with steering of the tractor through too light a grip of the front wheels on the ground, is minimized.

When passing over uneven ground, there may be a considerable tendency for the tractor and trailer to pitch and roll relative to each other. Complete freedom for such relative motion is afforded about the point of coupling (i. e., point of engagement of the hook 52 with the eye 91) since there is no obstruction to a wide degree of movement for the trailer tongue 90, both vertically and laterally (see Figs. 1 and 3). Despite any such rough motion, however, the eye 91 remains firmly engaged with the hook 52 in view of the latter's closure by the closely overlying underside portion of the tractor.

In turning right or left, as the tractor snakes the trailer past obstructions, the tractor and trailer turn laterally relative to each other about a vertical axis passing through the hook 52. Since that axis is located closely adjacent a vertical plane passing through the rear axle 23 of the tractor, the resultant close coupling causes the trailer to follow the tractor's movements with fidelity.

To uncouple the trailer, the driver has only to raise the quadrant lever 31 to pick up the trailer load on the hydraulic system and thus relieve the pressure on the latch 78, then reach back and hold down the release button 75, and thereafter restore the quadrant to "lowering" position. The suspension strut 64, 65, having been unlatched, the hitch links 21 descend upon return of the quadrant to "lowering" position, lowering the hook 52 until the stand 90A is grounded. Thereafter, the hook continues its downward movement a short distance, clearing the eye 91 so that the uncoupling is completed. The restricted size of the exhaust ports 49 limits the rate of descent of the hitch so that the front end of the trailer will be grounded smoothly and without heavy jarring.

Since the hydraulic system on the tractor is, as explained earlier, relieved of the trailer load when the trailer is coupled onto the tractor, the driver can use pressure fluid available from the hydraulic system whenever he desires for operating the auxiliary actuator 92 on the trailer. Assuming the trailer 85 to be coupled to the tractor and the auxiliary hydraulic lines 93, 96 connected, the driver can cause the actuator 92 to lift the trailer body 87 into dumping position by simply moving the quadrant lever 31 up to its "raise" position. Such shift of the quadrant lever opens the supply ports 44 for the pump as previously described. Fluid under pressure is accordingly delivered to the passage 47, which is open to both the main ram cylinder 30 and the auxiliary ram 92. Further movement of the piston 29 in the main ram cylinder being prevented by the abutment of the strut member 65 against the cross-member 61, the delivery pressure of the pump builds up until it is sufficient to move the piston in the auxiliary actuator 92, thus raising the trailer body. To lower the trailer body, the operator has only to restore the quadrant lever 31 to its "lowering" position, whereupon fluid is exhausted from both the main and auxiliary actuators through the exhaust ports 49. The auxiliary actuator 92 is not operated during the coupling-on operation, since the piston in the auxiliary actuator is dimensioned to have a substantially higher unit loading (pounds per square inch) than the piston 29 in the main actuator. With the two actuators connected in parallel, the more lightly loaded one will, of course, complete its travel before the other can move.

Safety features

As a generality, it is to be noted that whenever a heavy load is being towed from the rear end of any tractor, consideration must always be given to the possibility of the tractor rearing up and tipping over backwards. It will be appreciated that very heavy loadings may be encountered, for example, in the order of several tons for the trailer illustrated and which may substantially exceed the weight of the tractor itself. Moreover, the dangers in this aspect are substantially increased when the tractor is going up a steep incline.

Figure 4:
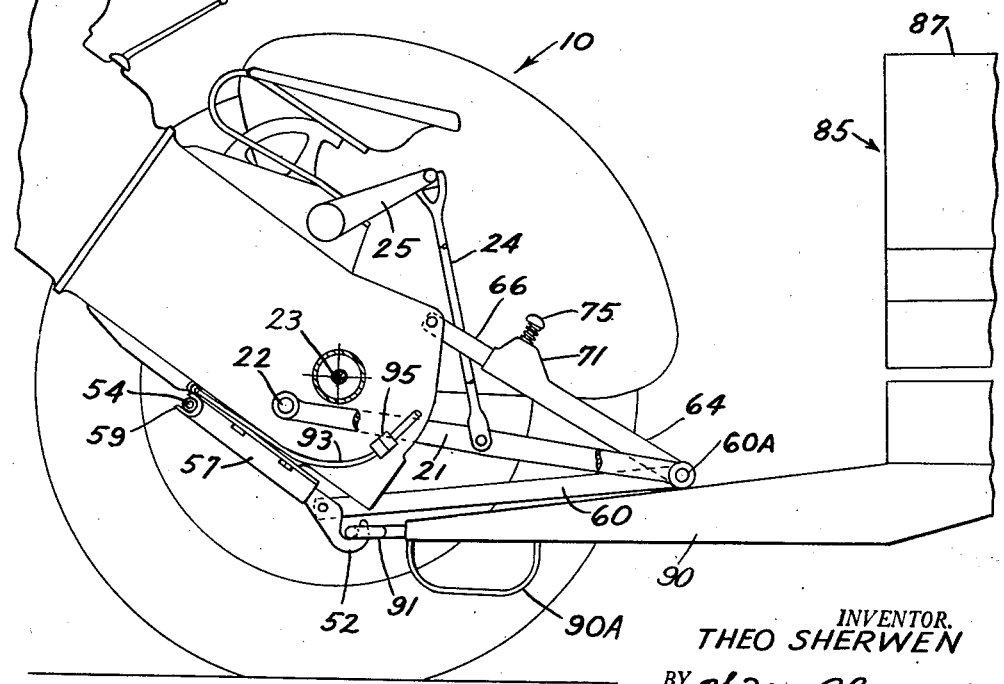
Fig. 4 is a side view on the scale of Fig. 2 but differing from the latter in that the tractor and trailer are shown in coupled condition and with the tractor reared up to the full extent permitted by safety arrangements of the connections.

The coupling harness herein disclosed is arranged to put a positive limit on the degree to which the tractor can rear in respect of the trailer. The cross-bar 61 is arranged to serve that purpose in coaction with the strut 64, 65. If the tractor should rear up as, for example, in proceeding up a hill with a heavy load in the trailer, the cross member 61 will strike the trailer tongue 90. Since the strut 64, 65 affords under such circumstances a solid connection from the cross member 61 to the tractor body, any further rearing of the tractor is safely prevented. The tractor is thus limited to a rearing position of approximately 45°, or a little less, as shown in Fig. 4. With the tractor reared up in such position, a maximum traction loading will be provided on the rear wheels, and the driver can, if he wishes, go on driving the tractor, steering it with individual braking of the rear wheels, until he gets out of the bad piece of terrain that caused the tractor to tend to rear.

The coupling harness disclosed is so constructed as to preclude the possibility that the driver might mount the coupling hook 52 with its supporting linkage 51, 60 without applying the safety or cross-bar 61. It is to preclude such possibility that the rear ends of the links 60 are secured to the hitch links 21 by the reduced ends or projections 60A on the cross-bar. Only when the cross-bar 61 is in place and thus ready to perform its safety function, as well as to receive the links 60, can the hook 52 be made operative at all.

Stowing the hook for transport

To simplify the work of installing and removing the coupling harness on the tractor, the angle irons 57, which are bolted to the tractor body and the link 51 carried by them, are normally left in place. To remove the remainder of the coupling harness, all that need be done is to pull out the pin 67 to free the clevis 66, remove the linch pins 62 and 63, and withdraw the projections 60A and 53 from the links 21 and 60, respectively.

With the remainder of the coupling harness thus removed, the link 51 and its hook 52 can be securely stowed for transport. For that purpose, in the illustrative embodiment of the invention described above, it is only necessary for the driver to grasp the hook and pull it upward tight against the underside of the center housing, compressing a leaf spring 56 (see Fig. 6) on the topside of the link. That brings the bosses 59A above the tops of the coacting L-shape bosses 59B so as to clear the latter. The link 51, while so raised, is pushed forward a short distance until the bosses 59A ride over the tops of the upright legs of the bosses 59B. Then, upon release of the link 51, the spring 56 pushes it downward with the bosses 59A securely seated in the pockets formed by the bosses 59B. The forward movement of the link 51, incident to such operation, is permitted by the open-jaw shape of the members 59 which receive the pivot projections 54. Stowage arrangements for securing the link 51 between the angle irons 57, other than the arrangement just described, may of course be utilized with equal facility.

I claim as my invention:

1. A coupling harness for a tractor having a pair of power operated hitch links trailing in laterally spaced side-by-side relation from its rear end portion for generally vertical swinging movement, said harness comprising, in combination, an assembly of inverted T-shape comprising a cross bar forming the head of the T and having fixed to it a telescoping strut forming the leg of the T, said cross bar being adapted to span the tractor borne hitch links and having means at its ends for detachably securing the same to the trailing ends of such links, means for detachably securing the upper end of said strut to an anchorage point on the tractor, a manually releasable latch for retaining said strut in contracted position, a supporting linkage jointed intermediate its ends and having its rear end pivotal on said cross bar, attachments for suspending the front end of said supporting linkage from the underside of the tractor in position to extend generally forwardly from said cross bar beneath the tractor to jackknife downwardly upon downward swing of the tractor's hitch linkage, and a coupling element carried by an intermediate portion of said supporting linkage.

2. In an attachment for a tractor having a trailing hitch linkage together with a power operated device for raising the same, the combination of a pair of telescoping strut elements connectible, respectively, to the hitch linkage and to an anchorage point on the tractor located generally above the hitch linkage, an abutment coacting with said strut elements for positively limiting their contracting movement to an amount less than the full rise of the hitch linkage, and a manually releasable latch automatically engageable to prevent re-extension of said elements when they are slid into substantially their fully contracted position.

3. In a coupling harness for a tractor having a power operated hitch linkage trailing from its rear end portion for generally vertical swinging movement, the combination of a supporting linkage joined intermediate its ends, attachments for detachably suspending said supporting linkage from its opposite end portions from the underside of the tractor and from the hitch linkage, respectively, in position to jackknife downwardly upon downward swing of the hitch linkage, and a coupling element carried by an intermediate portion of said supporting linkage.

4. In a coupling harness for a tractor having a pair of power operated hitch links trailing in laterally spaced side-by-side relation from its rear end portion for generally vertical swinging movement, the combination of an assembly of inverted T-shape comprising a cross bar forming the head of the T and having fixed to it a strut forming the leg of the T, said cross bar having pivot projections at its opposite ends for pivoting of the same on the trailing ends of the tractor borne hitch links with the cross bar spanning the latter, a supporting linkage jointed intermediate its ends and including a diverging pair of rear links having their trailing ends pivoted on said projections, attachments for suspendng the front end of said supporting linkage from the underside of the tractor in position to extend generally forwardly from said cross bar beneath the tractor to jackknife downwardly upon downward swing of the tractor's hitch linkage, and a coupling element carried by an intermediate portion of said supporting linkage.

5. In a coupling attachment for a tractor having a power operated pair of hitch links trailing in laterally spaced side-by-side relation from its rear end portion, the combination of a safety bar, attachments for securing said safety bar in position on the links to span the gap between their trailing ends, a strut adapted to be anchored to the tractor for limiting rise of the hitch linkage beyond a predetermined point, a coupling element, supporting linkage joined intermediate its ends, attachments for suspending said supporting linkage from its opposite end portions from the underside of the tractor and from the hitch links, respectively, in position to jackknife downwardly upon downward swinging of the hitch links, and an intermediate portion of said supporting linkage mounting said element below and forward of the safety bar's location on the trailing ends of the hitch links.

6. In a coupling harness for a tractor of the character set forth, the combination comprising a pair of anchorage attachments mountable in laterally spaced relation on the underside of the tractor, a coupling link having a coupling element at one end thereof, means including a relatively loose pivotal connection between the opposite end of said coupling link and an adjacent end of each said anchorage attachment, said pivotal connection being adapted to permit both pivotal and limited sliding movement of said link relative to said anchorage attachments, an outwardly projecting lateral abutment located intermediate the ends of said link, a coacting lateral abutment projecting inwardly from one of said anchorage attachments and located a shorter radial distance from said pivotal connection than said abutment on said link, said coacting lateral abutment being susceptible of engagement with said lateral abutment on said link and having portions adapted to preclude downward or rearward movement of the same, and resilient means connectible between said coupling link and the underside of the tractor for yieldably retaining said link and said abutments in an engaged condition.

7. In a coupling harness for a tractor including a rear housing defining a generally horizontal underside thereof, an elongated coupling link having a coupling element at one end thereof and an actuating connection for said link adjacent said coupling element, pivot means on the opposite end of said link, a pair of anchorage fittings each defining a lateral abutment and a pivotal anchor disposed a substantial distance from said abutment but not exceeding the distance between said pivot means and said actuating connection on said coupling link, means for attaching said anchorage fittings against the underside of the tractor housing to locate said pivotal anchors forwardly of the rear end thereof a distance approximately equal to the length of said coupling link and to dispose said fittings generally longitudinally along the tractor with said lateral abutments located rearwardly of said pivotal anchors in laterally spaced generally parallel relation to each other, said pivot means on said coupling link being engageable with said pivotal anchors of said fittings to support said link for swinging movement between a lowered position and a raised position nested against the underside of the tractor and between said lateral abutments of said fittings, and coacting retaining means on said lateral abutments and said coupling link for retaining the latter in nested position between said lateral abutments.

8. For use on a tractor including a rear housing defining a generally horizontal underside thereof, and having a pair of power operated hitch links trailing in laterally spaced relation from the rear end portion of the tractor for vertical movement relative thereto, a coupling linkage comprising two elongated sections pivotally connected to each other, one of said sections having an open coupling hook on one end thereof adjacent the pivotal connection between said sections, pivot means adapted to pivot the opposite end of said one linkage section to the underside of the tractor housing at a position thereon spaced from the rear end thereof a distance substantially equal to the length of said one section, and means on the end of the other of said linkage sections remote from said one section for pivotally connecting said other section to the tractor hitch links to enable the links to carry said linkage upwardly for swinging said one linkage section into contiguous parallel relation to the tractor housing.

9. In a coupling attachment for a tractor having a draft link trailingly pivoted on the rear end portion thereof, a hydraulic power lift device interconnected with the link for raising the same, disabling means associated with the power lift device for cutting-out operation thereof upon progression of the draft link into its uppermost position, and fittings on the rear end portion of the tractor for controlling the power lift device by means of a compression link, the combination comprising a coupling device attachable to the tractor draft link and movable therewith between a lowered coupling position and an elevated towing position, and a self-engaging elongated mechanical latching linkage for defining said elevated towing position, said mechanical latching linkage having means at one end thereof connectable with said coupling device and means at the other end thereof connectable with the power lift controlling fittings on the rear end portion of the tractor for terminating upward movement of the draft link short of its normally uppermost position to prevent disabling of the hydraulic lift device, said latching linkage serving to mechanically support the draft link and said coupling device in said elevated towing position and being readily releasable to permit free vertical swinging movement of the draft link below the normal uppermost position thereof.

10. In a coupling attachment for a tractor having a draft link trailingly pivoted on the rear end portion thereof, a hydraulic power lift device interconnected with the link for raising the same, and a disabling control associated with the power lift device for cutting-out operation thereof upon progression of the draft link into its uppermost position, the combination comprising a coupling linkage pivotally joined intermediate its ends and having a coupling element carried by an intermediate portion thereof, attachments for detachably suspending said coupling linkage from its opposite end portions from the underside of the tractor and from the tractor draft link, respectively, in position to jackknife between a lowered coupling position and an elevated towing position in response to vertical swinging movement of the draft link, and elongated mechanical latching means connectable between said coupling linkage and the rear end portion of the tractor for terminating upward movement of the draft link short of its normally uppermost position to prevent disabling of the hydraulic lift device, said latching means serving to mechanically support the draft link and said coupling linkage in raised towing position and being readily releasable to permit free vertical swinging movement of the draft link below the normal uppermost position thereof.

11. For use with a tractor having a draft link trailingly pivoted on the rear end portion thereof for generally vertical swinging movement relative thereto, a hydraulic power lift system interconnected with the draft link for raising the same, disabling means associated with the power lift system for cutting out operation thereof upon progression of the draft link into its normally uppermost position, and a fixed anchor on the rear portion of the tractor, an auxiliary hydraulic actuator fitted with means for hydraulically interconnecting said auxiliary actuator with the tractor hydraulic lift system to be energized therefrom, and an elongated motion limiting device of the self-engaging type having means on one end thereof connectable with the tractor draft link and means on the other end thereof connectable directly to the fixed anchor on said tractor, said limiting device serving to arrest upward motion of the draft link short of its normally uppermost position to preclude operation of the disabling means and thus preserve the capability of the tractor power lift system to energize said auxiliary actuator.

12. For use with a tractor having a draft link trailingly pivoted on the rear end portion thereof for generally vertical swinging movement relative thereto, a hydraulic power lift system interconnected with the draft link for raising the same, rocker means for controlling the lift system in response to force applied by a compression link, pivotal anchor means fixed to the rear portion of the tractor and pivotally supporting the rocker means, and disabling means associated with the power lift system for cutting out operation thereof upon progression of the draft link into its normal uppermost position, an elongated motion limiting device of the self-engaging type having means on one end thereof connectable with the tractor draft link and means on the other end thereof connectable directly to the pivotal anchor means fixed to said tractor, said limiting device serving to arrest upward motion of the draft link short of its normal uppermost position to preclude operation of the disabling means and thus preserve the capability of the tractor power lift system to serve as a source of pressure fluid for energizing auxiliary hydraulic actuators, said motion limiting device permitting free vertical swinging movement of said draft link below the point at which its upward motion is arrested under its normally uppermost position.

13. In a coupling harness for a tractor having housing and a power-operated hitch linkage trailing from its rear end portion for vertical swinging movement, the combination of a pair of elongate anchorage fittings having mounting faces thereon for securing them in nested relation against the underside of the tractor housing, said anchorage fittings also having a pair of opposed rigid abutments disposed in laterally spaced relation with each other, said abutments having forward and rearward ends, pivotal anchorage means on said respective anchorage fittings disposed generally in registry with each other at a substantial distance from the rearward ends of said rigid abutments, a coupling link having a coupling element at one end thereof and an actuating connection for said link adjacent said coupling element, means pivotally attaching the opposite end of said coupling link to said pivotal anchorage means for vertical swinging movement of said coupling link between a depending coupling position and a raised towing position wherein that portion of said coupling link between said pivotal attaching means and said actuating connection nests between said opposed rigid abutments for support against lateral bending, and link means adapted for interconnection between the trailing end of said hitch linkage and said actuating connection on said coupling link for effecting said vertical swinging movement of the latter.

14. For use with a tractor having a trailing hitch linkage together with a power-operated device for moving the same between a lowered position and a fully elevated position, a variable length telescoping strut having means for connecting one end thereof to the hitch linkage and means for connecting the opposite end thereof to an anchorage point on the tractor located generally above the hitch linkage, said strut having an extended position and a collapsed position with sufficient travel therebetween to accommodate full movement of the hitch linkage between said lowered and said elevated positions, a mechanical latch mechanism on said strut having interlocking abutments disposed to engage automatically as said strut approaches said collapsed position in response to raising of the hitch linkage, said interlocking abutments being constructed and arranged to hold said strut against re-extension once the same has been collapsed to a point just short of said collapsed position, and a manual trip on said latch mechanism adapted to disengage said interlocking abutments and thereby release said strut for re-extension.

15. In a coupling attachment for a tractor having a draft linkage trailingly pivoted on the rear end portion thereof together with a hydraulic power lift device for raising the same, the tractor having disabling means associated with the power lift device for cutting out operation of the same upon arrival of said draft linkage at an extreme raised position, the tractor also having an attachment fitting situated on its rear end portion above said draft linkage, the combination comprising a coupling device having means for attaching the same to the draft linkage and movable therewith between an elevated load-sustaining position short of said extreme raised position of said draft linkage and a lowered load-releasing position, and an elongated collapsible suspension strut having means at one end thereof connected with said coupling device and means at the other end thereof connectable with the attachment fitting on the rear end portion of the tractor, said strut having a collapsed position corresponding to said elevated load-sustaining position of said coupling device, and a latch mechanism carried by said strut having interlocking abutments which engage automatically as an incident to arrival of said strut in said collapsed position, said interlocking abutments being constructed and arranged to hold said strut against re-extension once said strut has been collapsed.

References Cited in the file of this patent
UNITED STATES PATENTS

| | | |
|---|---|---|
| Re. 22,642 | Ferguson | May 15, 1945 |
| 918,062 | King | Apr. 13, 1909 |
| 1,943,594 | Flatley | Jan. 16, 1934 |
| 1,973,107 | Sanders et al. | Sept. 11, 1934 |
| 2,034,674 | Edwards | Mar. 17, 1936 |
| 2,210,907 | Erickson | Aug. 13, 1940 |
| 2,320,168 | Benjamin et al. | May 25, 1943 |
| 2,327,308 | Johnston | Aug. 17, 1943 |
| 2,347,898 | Ferguson | May 2, 1944 |
| 2,375,970 | Williams | May 15, 1945 |
| 2,446,223 | Forney | Aug. 3, 1948 |
| 2,461,885 | Estes | Feb. 15, 1949 |